G. H. HAYES.
SHOCK ABSORBER.
APPLICATION FILED DEC. 24, 1917.
1,386,782. Patented Aug. 9, 1921.
2 SHEETS—SHEET 1.
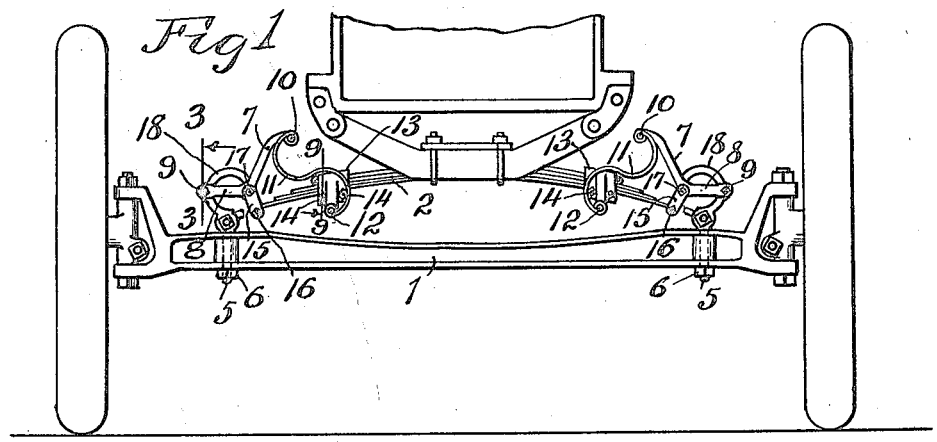
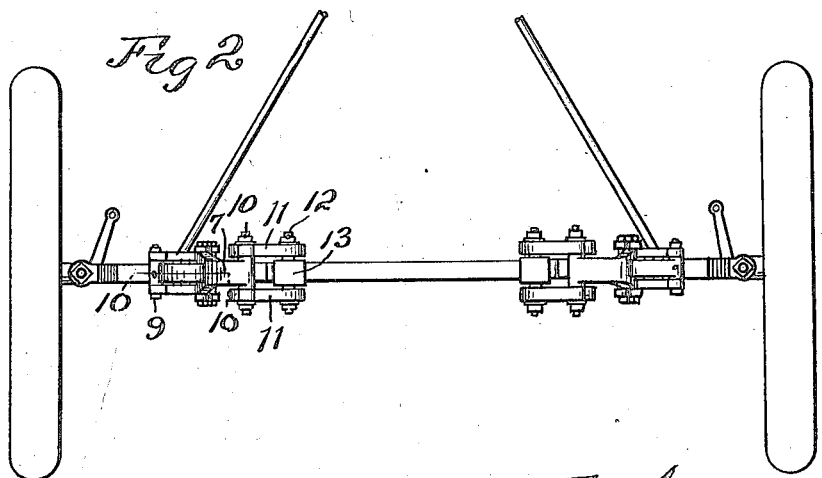
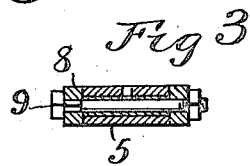
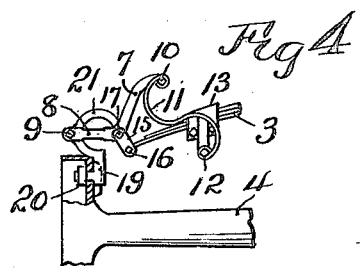
WITNESS:
INVENTOR.
George H. Hayes,
BY Warren D. House
His ATTORNEY

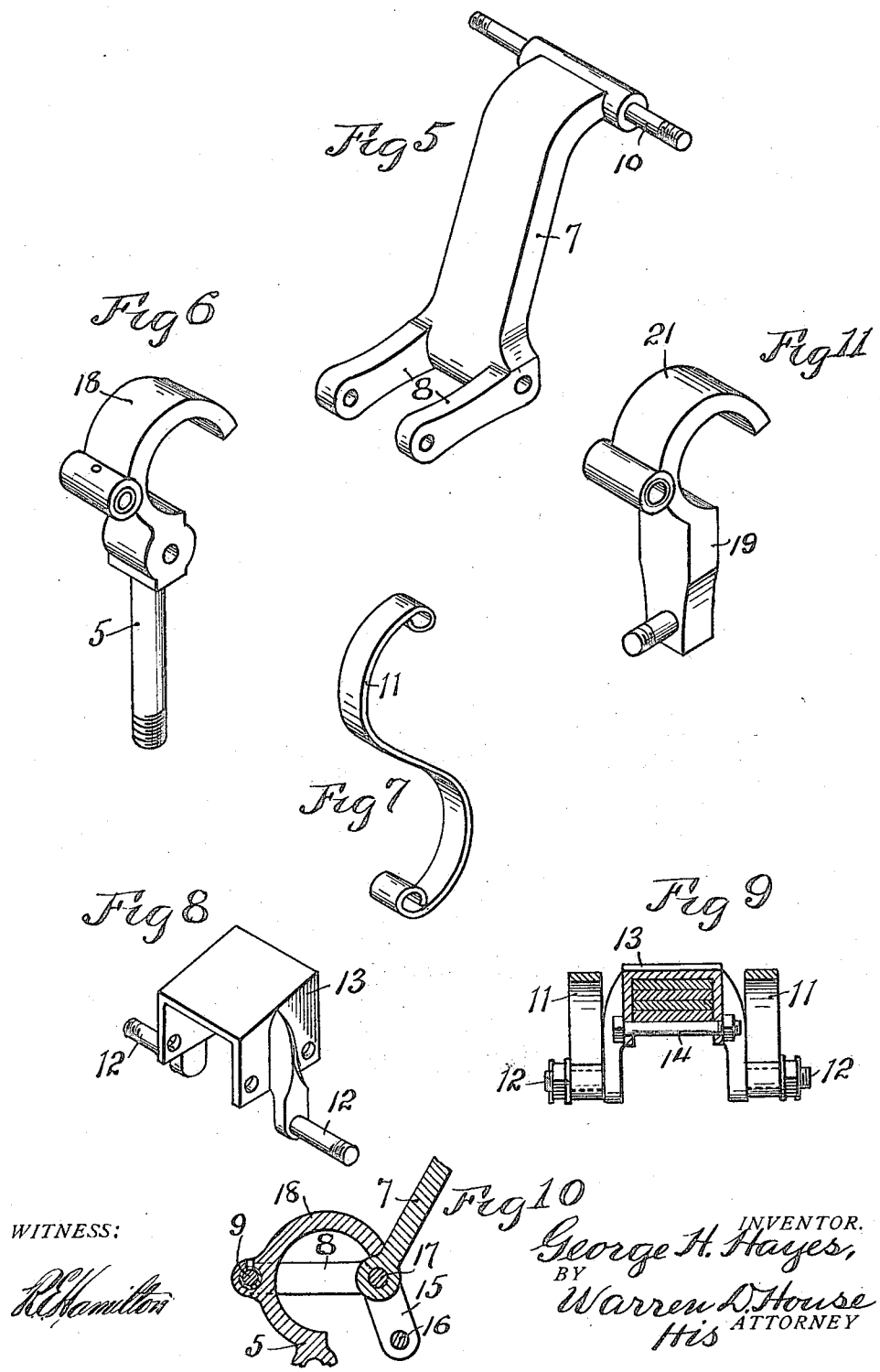

UNITED STATES PATENT OFFICE.

GEORGE H. HAYES, OF HAZELTON, KANSAS.

SHOCK-ABSORBER.

1,386,782. Specification of Letters Patent. Patented Aug. 9, 1921.

Application filed December 24, 1917. Serial No. 208,651.

*To all whom it may concern:*

Be it known that I, GEORGE H. HAYES, a citizen of the United States, residing at Hazelton, in the county of Barber and State of Kansas, have invented a certain new and useful Improvement in Shock-Absorbers, of which the following is a specification.

My invention relates to improvements in shock absorbers, adapted for use on automobiles, and particularly adapted for use on the well known Ford cars.

The object of my invention is to provide a novel shock absorber which will to a great extent eliminate bouncing and jolting due to lateral movement of the car body.

A further object of my invention is to provide a shock absorber, which is strong and durable, not liable to get out of order, simple in construction and cheap to manufacture and which may readily be applied to automobiles now in use.

The novel features of my invention are hereinafter fully described and claimed.

In the accompanying drawings, which illustrate the preferred embodiment of my invention, as applied to a Ford car, Figure 1 is a front elevation of a part of an automobile which is equipped with my improvement.

Fig. 2 is a top view of some of the parts shown in Fig. 1.

Fig. 3 is an enlarged vertical sectional view on the line 3—3 of Fig. 1.

Fig. 4 is an elevation of one of my improved shock absorbers, shown applied to the rear axle casing and the rear spring, portions of which are shown.

Fig. 5 is an enlarged perspective view of the lever which supports one end of one of the leaf springs of the automobile.

Fig. 6 is a perspective view of the supporting member which is carried by the front axle and to which the lever shown in Fig. 5 is pivoted.

Fig. 7 is an enlarged perspective view of one of the S-shaped springs which connect the levers and the adjacent leaf springs.

Fig. 8 is an enlarged perspective view of one of the clamping plates to which the S-shaped springs are pivoted.

Fig. 9 is an enlarged vertical sectional view on the line 9—9 of Fig. 1.

Fig. 10 is an enlarged vertical sectional view on the line 10—10 of Fig. 2.

Fig. 11 is an enlarged perspective view of one of the lever supporting members carried by the rear axle casing.

Similar reference characters designate similar parts in the different views.

1 and 2 designate respectively the front axle and the front leaf spring which carries the load and which is of the usual type.

3 designates the rear automobile spring, shown in Fig. 4, which is of the usual leaf type.

4 designates the rear axle casing, also shown in Fig. 4, which is of the ordinary construction.

Four shock absorbers are employed on each automobile, two being applied to the front load carrying spring 2, and two, similar to the one shown in Fig. 4, being employed to support respectively the two ends of the rear load carrying spring 3.

The two front shock absorbers are alike in construction, so that a description of one will suffice for both.

Mounted on the front axle 1 is a support comprising a supporting member, shown in Fig. 6, provided with a shank 5 which is mounted in a vertical hole in the axle 1 to which it is secured by means of a nut 6 which bears against the under side of the axle.

An upwardly and inwardly inclined lever 7, Fig. 5, is provided with two horizontal outwardly extending arms 8 which embrace opposite sides respectively of the supporting member 5 to which the arms are pivoted by means of a horizontal bolt 9.

A horizontal transverse bolt 10, Fig. 5, extends through the upper end of the lever 7, and has respectively pivoted to its projecting ends the upper ends of two S-shaped springs 11, the lower ends of which are respectively pivoted to two transverse pins 12, which extend laterally in opposite directions from the two vertical arms of a U-shaped clamping member 13, Figs. 8 and 9, which embraces the spring 2 to which it is secured by two bolts 14 which extend through the arms of the member 13 and bear against the under side of the spring 2.

For pivotally supporting the adjacent end of the spring 2, upon the lever 7, there are provided two links 15, the lower ends of which are pivoted to the adjacent end of the spring 2 by a bolt 16, Figs. 1 and 10.

The upper ends of the links 15 are pivoted to a transverse bolt 17, which extends through the lever 7 transversely to the axle 1.

For limiting the upward movement of the lever 7 and serving as a stop therefor, the supporting member is provided with an inwardly extending arcuate portion 18, the inner end of which is adapted to be struck by the lever 7, as is best shown in Fig. 10.

It will be noted that the clamping plates 13 are secured to the spring 2 intermediate of the ends thereof and the central portion of the spring which carries the load.

It will also be noted that the links 15 are pivoted to the lever 7 intermediate of the fulcrum bolt 9 and the bolt 10, to which the upper end of the spring 11 is attached.

By means of this construction, when the load forces the spring 2 downwardly, the levers 7 will be swung downwardly by the supporting links 15, thereby further compressing the springs 11, owing to the bolt 10 being moved a greater distance in the swinging movement than the bolts 12 or 17. The springs 11 will, therefore, assist the spring 2 in supporting the load.

When the load moves upwardly upon the reflex movement of the spring 2, the levers 7 will be swung upwardly until they strike the stops 18 of the supporting members 5. The outer ends of the spring 2 and the levers 7 will thus be stopped in their upward movement, and the springs 11 will be compressed by and will resist yieldingly the further upward movement of the middle portion of the spring 2.

The springs 11 thus, to a great extent, eliminate upward and downward jolting.

The springs 11 further to a great extent eliminate shock due to lateral movement of the load. As the load with the spring 2 moves laterally in either direction, being supported by the links 15, which are suspended from the levers 7, so as to permit endwise movement of the spring 2, such lateral movement of the spring 2 will be resisted by the springs 11, one of which will be further compressed and the other of which will expand.

It will be noted that the S-shaped springs 11 are disposed in different vertical planes from the vertical plane of the leaf spring 2. By means of this construction, there is no liability of the springs 11 being crushed between the spring 2 and the lever 7. Furthermore, the full elasticity of the springs is afforded. The S-shaped spring provides one which is very strong and instantaneous in action.

Each of the shock absorbers which support the rear spring 3, is constructed like each of those employed to support the front spring 2, and already described, excepting that there is substituted for the supporting member 5 a supporting member 19, which extends through and is secured to the adjacent end of the axle casing 4 by a nut 20, Fig. 4.

The supporting member 19 is provided with an arcuate portion 21, similar to the arcuate portion 18 and which serves as a stop for the lever 7 in the upward movement of the latter. The lever 7 is supported pivotally by a transverse bolt 9, corresponding in function and location to the bolt 9 already described. The S-shaped springs 11 are supported by the clamping plates 13 mounted on the spring 3 in the same manner as the corresponding clamping plates are mounted on the front spring 2. The operation of the rear shock absorbers is the same as the operation of the front shock absorbers which has already been described.

I do not limit my invention to the structure shown and described, as modifications, within the scope of the appended claims, may be made without departing from the spirit of my invention.

What I claim is:—

1. In a shock absorber, a lever, a support therefor arranged to form a rigid stop for limiting the upward movement of the lever, a load carrying leaf spring, an S shaped spring having its ends respectively pivoted to the lever and to the leaf spring, and a link supporting the adjacent end of the leaf spring and pivoted to the lever intermediate of the fulcrum of the latter and the S shaped spring, substantially as set forth.

2. In a shock absorber, a lever, a support therefor arranged to form a rigid stop for limiting the upward movement of the lever, a load carrying leaf spring, an inverted U shaped member embracing and supported by the leaf spring, two S shaped springs having their lower ends respectively pivoted to the arms of said inverted U shaped member and having their upper ends pivoted to said lever and located respectively at opposite sides of the leaf spring, and a link pivoted to the adjacent end of the leaf spring and pivoted to the lever intermediate of the fulcrum of the latter and the two S shaped springs, substantially as set forth.

In testimony whereof I have signed my name to this specification.

GEORGE H. HAYES.